(No Model.)

W. ALLDERDICE.
DIE AND DIE HOLDER FOR DRAWING.

No. 376,222. Patented Jan. 10, 1888.

Attest.
Geo. F. Robinson
H. B. Miller

Inventor
Winslow Allderdice
By Bradford Howland
Attorney.

UNITED STATES PATENT OFFICE.

WINSLOW ALLDERDICE, OF AKRON, OHIO, ASSIGNOR TO THE AKRON IRON COMPANY, OF SAME PLACE.

DIE AND DIE-HOLDER FOR DRAWING.

SPECIFICATION forming part of Letters Patent No. 376,222, dated January 10, 1888.

Application filed April 22, 1885. Serial No. 163,019. (No model.)

*To all whom it may concern:*

Be it known that I, WINSLOW ALLDERDICE, a citizen of the United States, residing at Akron, Summit county, Ohio, have invented a new and useful Improvement in Dies and Die-Holders for Drawing, Compressing, and Polishing Cold Metal Bars, of which the following is a specification.

The principal feature of my invention consists of dies formed of several rollers supported in position by contact of the die-holder with their peripheries.

Figure 1:
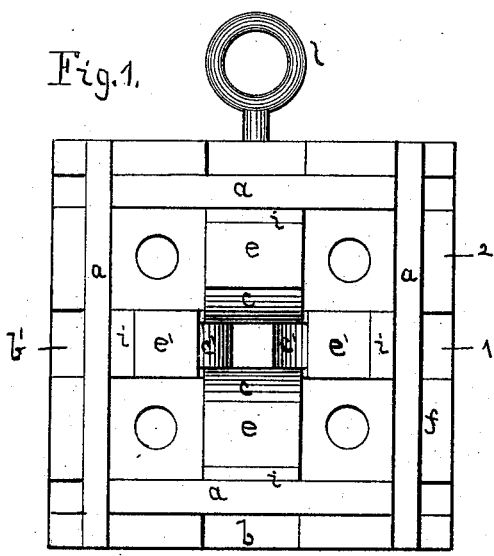
Figure 2:
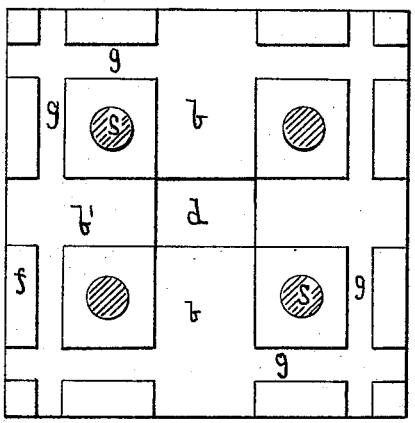
Figure 3:
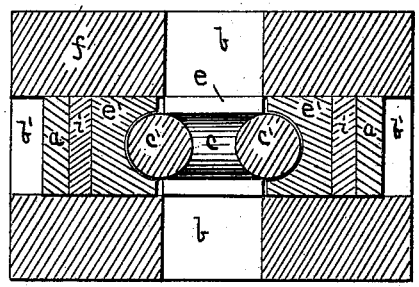
Figure 5:
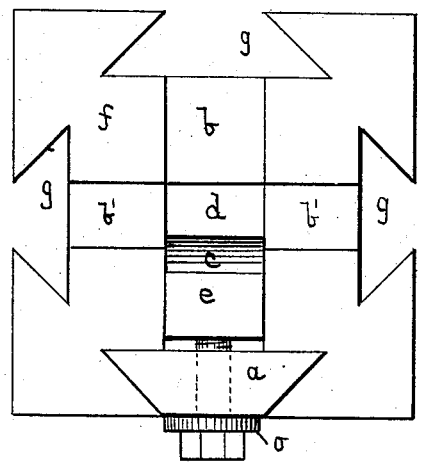
Figure 4:
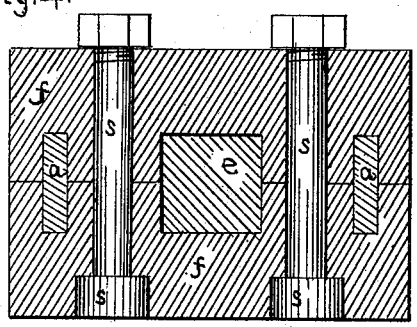
Figure 6:
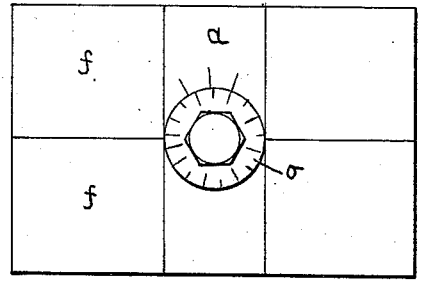

In the drawings forming a part of this specification, Figure 1 represents one of two similar sections $f$ of the die-holder frame $ff$, with gibs $a$ and die-supports $e\ e\ e'\ e'$, all forming parts of the die-holder, and the dies consisting of rollers $c\ c\ c'\ c'$. Fig. 2 represents the other section $f$ of the die-holder frame. Fig. 3 is a horizontal section of the holder and dies at line 1 in Fig. 1. Fig. 4 is a horizontal section of the same at line 2 in Fig. 1. Fig. 5 is an inside face view of a modified form of one of the sections $f$. Fig. 6 is an end view of the modified form of the die-holder.

Rollers $c\ c'$ form the die, and they are held in sockets formed in the ends of supports $e\ e'$, that are in contact with the peripheries of the rollers. The sides of rollers $c\ c$ are in contact with the ends of rollers $c'\ c'$. The length of the rollers, respectively, should be according to the width and thickness of the bar to be drawn. Each of the sections $ff$ is formed with a central opening, $d$, for the bar to be drawn to pass through, and grooves $b\ b'$ to receive supports $e\ e'$, and with grooves $g$ to receive gibs $a$ and templets $i$. The latter are of the required thickness to bring rollers $c\ c$ in contact with rollers $c'\ c'$ to form the die. Frame $ff$ is provided with handles $l$, for convenience in placing in a machine for drawing bars and removing it. Sections $f$ are fastened together by bolts $s$.

For the purpose of simplifying the adjustment of rollers $c\ c'$, I prefer to form sections $ff$ with dovetail grooves $g$ across them to receive gibs $a$, which are provided with set-screws, as shown in Figs. 5 and 6. The adjustment of the rollers can then be made by turning the set-screws. The heads of the set-screws and the gibs are marked with scales to facilitate proper adjustment of the rollers. The concave ends of the die-supports should cover substantially one-half of the peripheries of the rollers.

One of the advantages of the form of dies herein described is that they may be made in true shape by turning them in a lathe, and when worn can easily be turned in the concave ends of their supports to present a new face.

I claim as my invention—

1. A die and die-holder for drawing, compressing, and polishing cold metal bars, the die consisting of rollers forming an angular opening through which the bar is to be drawn, and the die-holder formed with sockets in contact with the peripheries of the rollers directly in rear of the bearing of the latter against said bar, substantially as described.

2. The rollers $c\ c'$, in combination with a die-holder having supports $e\ e'$, with their inner ends in contact with the peripheries of the rollers, substantially as described.

3. A die-holder formed of two similar sections, $ff$, having opening $d$, grooves $b\ b'\ g$, gibs $a$, and supports $e\ e'$, in combination with a die consisting of rollers, substantially as described.

WINSLOW ALLDERDICE.

Witnesses:
 W. F. MCCARTHY,
 J. G. RAYMOND.